Patented July 10, 1951

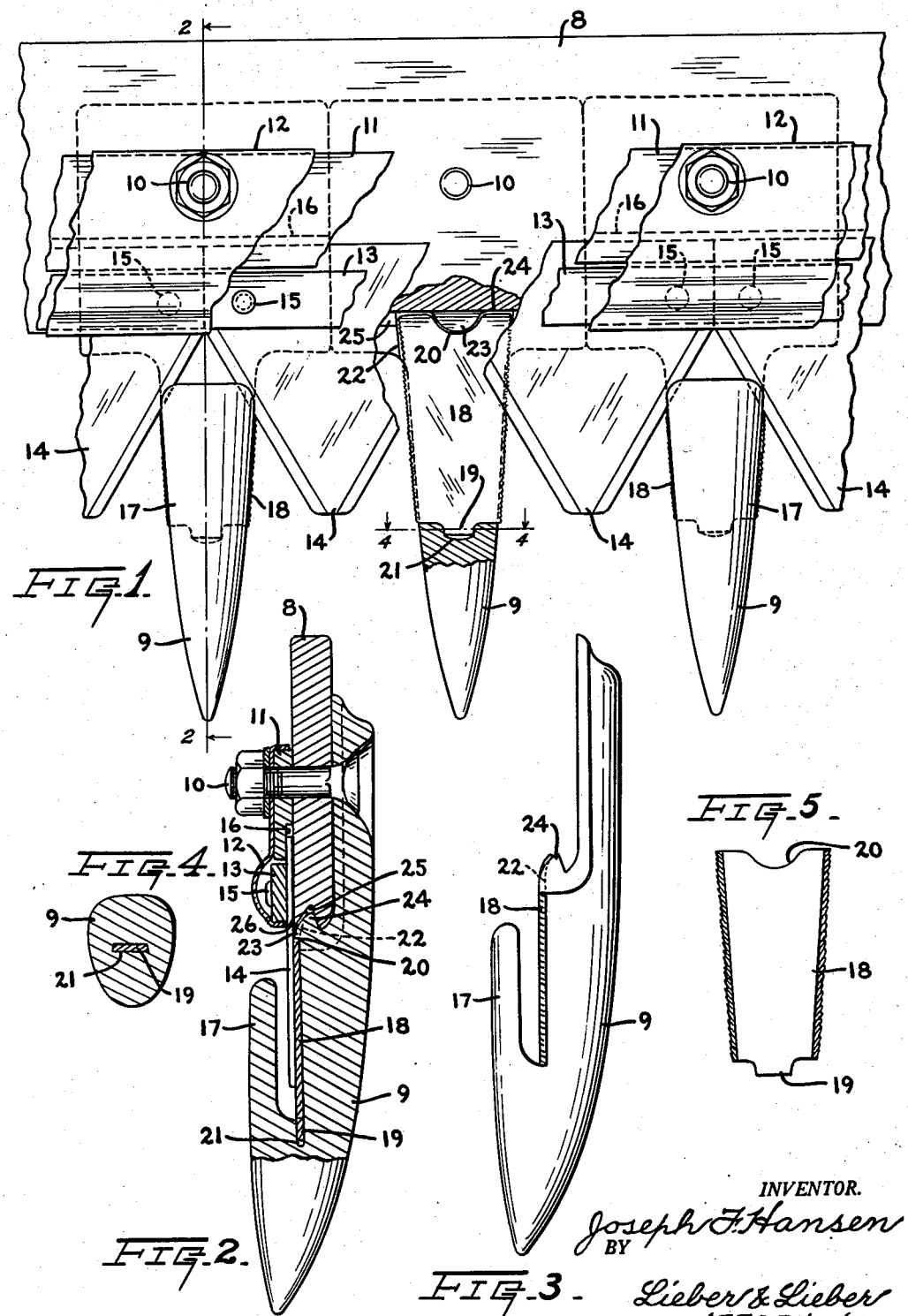

2,560,222

UNITED STATES PATENT OFFICE 2,560,222

DETACHABLE TOOTH AND BLADE IN MOWER BAR ASSEMBLY

Joseph F. Hansen, Sheboygan, Wis.

Application May 9, 1949, Serial No. 92,193

3 Claims. (Cl. 56—309)

The present invention relates generally to improvements in cutting implements and relates more particularly to improvements in the construction and operation of detachable blades for hay mowers or the like.

A primary object of the present invention is to provide an improved mower bar assemblage embodying detachable blades and which is extremely simple and durable in construction and highly flexible and efficient in operation.

A more specific object of this invention is to provide an improved mower bar assemblage wherein the fixed teeth are provided with blades which may be quickly and easily detached or replaced by a novice with the aid of ordinary tools.

Another specific object of my invention is to provide an improved mower bar assemblage of the type embodying a reciprocable cutter bar having a series of knives cooperable with a similar series of fixed blades to effect the cutting or mowing operation, and wherein all parts are readily accessible for inspection, replacement or repair.

Another specific object of the invention is to provide an improved mower blade and fastening means for firmly fixedly securing the same in position without need for welding or riveting and in a manner such as to render the blade quickly detachable.

Another specific object of the invention is to provide an improved mower bar assemblage embodying relatively few parts, all of which may be readily manufactured, assembled and repaired at relatively low cost and in a minimum amount of time.

A further specific object of my present invention is to provide an improved mower bar assemblage comprising, a carrier bar having a series of teeth each provided with a recess near one end, a fixed blade for each tooth each blade having an end portion coacting with the adjacent tooth recess and the opposite end coacting with the carrier bar to retain the blades in fixed position, and a cutter bar having movable blades cooperable with the fixed blades.

An additional specific object of the present invention is to provide an improved mower bar assemblage comprising, an elongated carrier bar having a groove extending along one edge, a series of teeth each having a flange coacting with the groove, fixed blades each having an outer end coacting with the outer portion of one of the teeth and an inner end projecting into the groove, and means for clamping each tooth to the bar to simultaneously lock the corresponding blades to the teeth.

These and other specific objects and advantages of the present invention will be apparent from the following detailed description.

A clear conception of the various features constituting the present improvement, and of the mode of constructing and of utilizing a typical mower bar assemblage embodying the invention, may be had by referring to the drawing accompanying and forming a part of this specification wherein like reference characters designate the same or similar parts in the various views.

Fig. 1 is a fragmentary top view of one of my improved mower bar assemblages, parts being broken away to reveal normally concealed structure;

Fig. 2 is a transverse section through the assemblage, taken centrally of one of the fixed teeth along the line 2—2 of Fig. 1;

Fig. 3 is a side view of one of the teeth removed from its carrier bar and with a blade in place thereon;

Fig. 4 is a transverse section through one of the teeth and its blade, taken along the line 4—4 of Fig. 1; and Fig. 5 is a top view of one of my improved blades.

While the improved mower bar assemblage is shown and described herein as embodying a series of separable teeth of a particular configuration cooperatively associated with a reciprocable cutter bar provided with a series of knives likewise of a particular design, it is not my desire or intent to thereby unnecessarily restrict or limit the scope or utility of the new features; and it is also contemplated that specific descriptive terms employed herein be given the broadest possible interpretation consistent with the disclosure.

Referring to the drawing, the typical mower bar assemblage shown in Figs. 1 and 2 comprises, in general, an elongated mower or carrier bar 8 having a series of fixed teeth 9 secured thereto in a suitable manner as by means of bolts 10; an elongated guide bar 11 and a cover and retainer plate 12 likewise fixedly secured to the carrier bar 8 by the bolts 10; a reciprocable cutter bar 13 having a series of knives 14 secured thereto by rivets 15 or the like, the cutter bar 13 being confined beneath the cover plate 12 and being actuatable in a well-known manner through a suitable connection with a driving source, not shown; and a fixed machined blade rigidly secured to each of the teeth 9, usually by rivets of the like.

As illustrated, the guide bar 11 may be provided with a longitudinal slot 16 for receiving and guiding the inner edge portions of the knives 14, while the cutter bar 13 is guided in its reciprocating movement by the bar 11 in cooperation with the plate 12. The fixed teeth 9 are normally pointed, as shown, and are of considerably greater length than the knives 14 so as to act as guards for these knives; and to more effectively protect the knives 14, each tooth 9 is longitudinally slotted as shown in Figs. 2 and 3 to receive the outer ends of the knives 14 and to provide a protective overhanging shield portion or guard finger 17. Since the teeth 9 are obviously subjected to considerable abuse and often strike hard terrain and rocks during use of the mower, it is not uncommon to have these teeth break, crack or bend, after which they may be detached from the carrier bar 8 in an obvious manner for replacement. The multilated and replaced tooth, or teeth as the case may be, is then normally discarded; and since it has heretofore been customary to secure the usual stationary or fixed cutting blades directly to the teeth in a more or less permanent manner, as by means of rivets or the like, these fixed machined blades have heretofore either been discarded with the teeth or it was necessary to remove and salvage the same in a time-consuming manner.

In accordance with my invention, each of the teeth 9 is provided with a normally fixed blade or ledger plate 18 which may be readily removed upon detachment of the corresponding tooth from the bar 8 and without need for machining operations; and to effect this desired result, the improved construction is as follows: Each ledger plate 18 is formed with a tongue 19 at one end thereof and with a central notch 20 at its other end; and each of the teeth 9 is provided with a longitudinal recess 21 near its outer end below the guard finger 17 and with an upwardly open depression 22 and a medial transverse retaining projection 23 near the inner end thereof adjacent to the bar 8, each tooth 9 also being formed with an edge flange 24 adjacent the depression 22 and projection 23 and adapted to coact with a groove 25 extending along the entire forward edge of the carrier bar 8 and forming a lip 26 extending toward the recess 21.

In assembling the improved mower bar, each of the teeth 9 is first provided with one of the ledger plates 18, the outer end portion or tongue 19 of which is inserted within the recess 21 of the adjacent or corresponding tooth with the inner portion of the plate 18 seated within the depression 22 and the notch 20 of the blade coacting with the adjacent projection 23. The teeth are then placed in position in series relative to the carrier bar 8 with the flange 24 of each tooth 9 coacting with the groove 25 of the bar 8, as shown in Figs. 1 and 2, and with the inner end of each blade likewise projecting into the groove 25 below the lip 26. Finally, after the guide bar 11, plate 12 and cutter bar 13 have been properly positioned in an obvious and well-known manner, the bolts 10 or other suitable clamping means may be applied; and as the bolts 10 are tightened, each tooth 9 is obviously clamped in place to the bar 8, the corresponding ledger plate 18 being simultaneously locked to its tooth by coaction of the lip 26 with the inner portion of the blade. The mower bar is thus completely assembled and, as the cutter 13 is reciprocated in a well-known manner by a suitable driving source, the knives or movable blades 14 cooperate with the fixed plates 18 to perform the cutting or mowing operation; and as the mower is advanced, the teeth 9 effectively guard the blades 14 and plates 18. If any of the teeth 9 are damaged during operation and it becomes necessary to replace the same, the damaged tooth may be readily removed by simply detaching the corresponding bolt 10; and before the tooth is discarded, the adjacent ledger plate 18 may be salvaged, without resorting to machining operations, by merely lifting the same in an obvious manner from its seat within the depression 22 and drawing the tongue 19 longitudinally from within the recess 21.

From the foregoing detailed description, it should be apparent that my present invention provides an improved mower bar assemblage wherein the normally fixed ledger plates are detachably fastened to the fixed teeth in a highly effective and simple manner. The improved mower bar assemblage is, in fact, extremely simple and durable in construction and is highly flexible and efficient in operation and all parts may be readily replaced without need for special tools. In case of damage to any of the teeth 9, the adjacent machined plate may be readily salvaged as hereinabove fully described; and likewise in the case of damage to any one of the plates 18 or if it becomes necessary to sharpen any one of these plates, the same may be readily removed for replacement or repair without the necessity of machining operations and without danger of breaking adjacent parts. Each of the ledger plates 18 is rigidly retained in position with respect to its tooth 9 by cooperation of the tongue 19 with the recess 21 and the notch 20 with the adjacent projection 23, and by seating the plate 18 within an adjacent depression 22 of its tooth, the assemblage is rendered even more sturdy and a more effective clamping action by the lip 26 of the bar 8 is obtained. The improved assemblage comprises relatively few parts, all of which may be readily manufactured, assembled and repaired at low cost and with a minimum amount of time.

While the improved mower bar assemblage specifically shown and described herein has proven highly successful and satisfactory in actual use, it should, however, be understood that it is not desired or intended to limit the invention to the exact details of construction and operation herein shown and described since various modifications within the scope of the claims may occur to persons skilled in the art to which this invention pertains.

I claim:

1. In combination, a mower tooth having therein a longitudinal slot forming a guard finger, said tooth being provided with a recess at the end of said slot and with a transverse flange and a projection remote from said recess, a carrier bar for said tooth having a groove coacting with said flange, and a ledger plate having a tongue at one end insertible within said recess and a notched opposite end cooperable with said projection and clamped within said groove by said flange.

2. In combination, a mower tooth having a guard finger forming a slot opening toward the base of the tooth, said tooth being provided at the closed end of said slot with a central recess and outwardly beyond the open slot end with a transverse flange and a central projection, a carrier bar for said tooth having a groove for receiving said flange, and a ledger plate having a tongue at one end insertible within said recess and a notched opposite end cooperable with said projection and clampingly confined within said groove by said flange.

3. In combination, a mower tooth having a guard finger forming a slot opening toward the base of the tooth, said tooth being provided at the closed end of said slot with a central recess and outwardly beyond the open slot end with a transverse flange and a central projection, a carrier bar for said tooth having a groove for receiving said flange, and a ledger plate having a central tongue at one end insertible within said recess and being provided at its opposite end with a central notch cooperable with said projection and with downwardly inclined portions extending into said groove, and means for detachably securing said tooth to said bar to cause said flange to clamp said inclined plate portions within said groove.

JOSEPH F. HANSEN.

REFERENCES CITED

The following references are of record in the file of this patent:

UNITED STATES PATENTS

| Number | Name | Date |
| --- | --- | --- |
| 489,062 | Wilson | Jan. 3, 1893 |
| 539,505 | Burrell et al. | May 2, 1895 |
| 641,123 | Kukacka | Jan. 9, 1900 |
| 662,637 | Dennis | Nov. 27, 1900 |
| 1,652,238 | Crawford | Dec. 13, 1927 |
| 2,096,238 | Fulton | Oct. 19, 1937 |
| 2,149,347 | Johnson | Mar. 7, 1939 |
| 2,475,349 | Boyer | July 5, 1949 |

FOREIGN PATENTS

| Number | Country | Date |
| --- | --- | --- |
| 11,186 | Great Britain | Aug. 16, 1887 |